United States Patent
Thomas et al.

(10) Patent No.: US 10,131,327 B2
(45) Date of Patent: Nov. 20, 2018

(54) DISC BRAKE ASSEMBLY

(71) Applicants: MERITOR HEAVY VEHICLE BRAKING SYSTEMS (UK) LIMITED, Cwmbran Gwent (GB); SCANIA CV AB, Sodertalje (SE)

(72) Inventors: Paul Anthony Thomas, Cwmbran Gwent (GB); Huw Wills-Wood, Cwmbran Gwent (GB); Adrian Bull, Cwmbran Gwent (GB); Mats Lofstrand, Sodertalje (SE)

(73) Assignees: Meritor Heavy Vehicle Braking Systems (UK) Limited, Cwmbran, Gwent (GB); Scania CB AB, Södertälje (SE)

( * ) Notice: Subject to any disclaimer, the term of this patent is extended or adjusted under 35 U.S.C. 154(b) by 266 days.

(21) Appl. No.: 14/910,092

(22) PCT Filed: Jul. 23, 2014

(86) PCT No.: PCT/EP2014/065836
§ 371 (c)(1),
(2) Date: Feb. 4, 2016

(87) PCT Pub. No.: WO2015/018642
PCT Pub. Date: Feb. 12, 2015

(65) Prior Publication Data
US 2016/0167628 A1 Jun. 16, 2016

(30) Foreign Application Priority Data

Aug. 7, 2013 (EP) ..................................... 13179532

(51) Int. Cl.
*F16D 55/00* (2006.01)
*F16D 55/22* (2006.01)
(Continued)

(52) U.S. Cl.
CPC .............. *B60T 1/065* (2013.01); *F16D 55/00* (2013.01); *F16D 55/22* (2013.01);
(Continued)

(58) Field of Classification Search
CPC .... B60T 1/06; B60T 1/065; F16D 2055/0037; F16D 55/00; F16D 55/22; F16D 2250/00;
(Continued)

(56) References Cited

U.S. PATENT DOCUMENTS 6,302,243 B1 * 10/2001 Ruiz ..................... F16D 55/228
188/73.1
7,341,130 B2 3/2008 Samuelsson
(Continued)

FOREIGN PATENT DOCUMENTS

DE 102009023104 A1 12/2009
EP 1570189 B1 10/2008

*Primary Examiner* — Bayan Salone
(74) *Attorney, Agent, or Firm* — Brooks Kushman P.C.

(57) ABSTRACT

A disc brake assembly and a method of mounting a disc brake assembly. The disc brake assembly may have a caliper that may receive first and second brake pads, a cover, and a spacer. The cover may have an opening pattern arranged to allow insertion and removal of the spacer.

15 Claims, 7 Drawing Sheets

Figure 1:
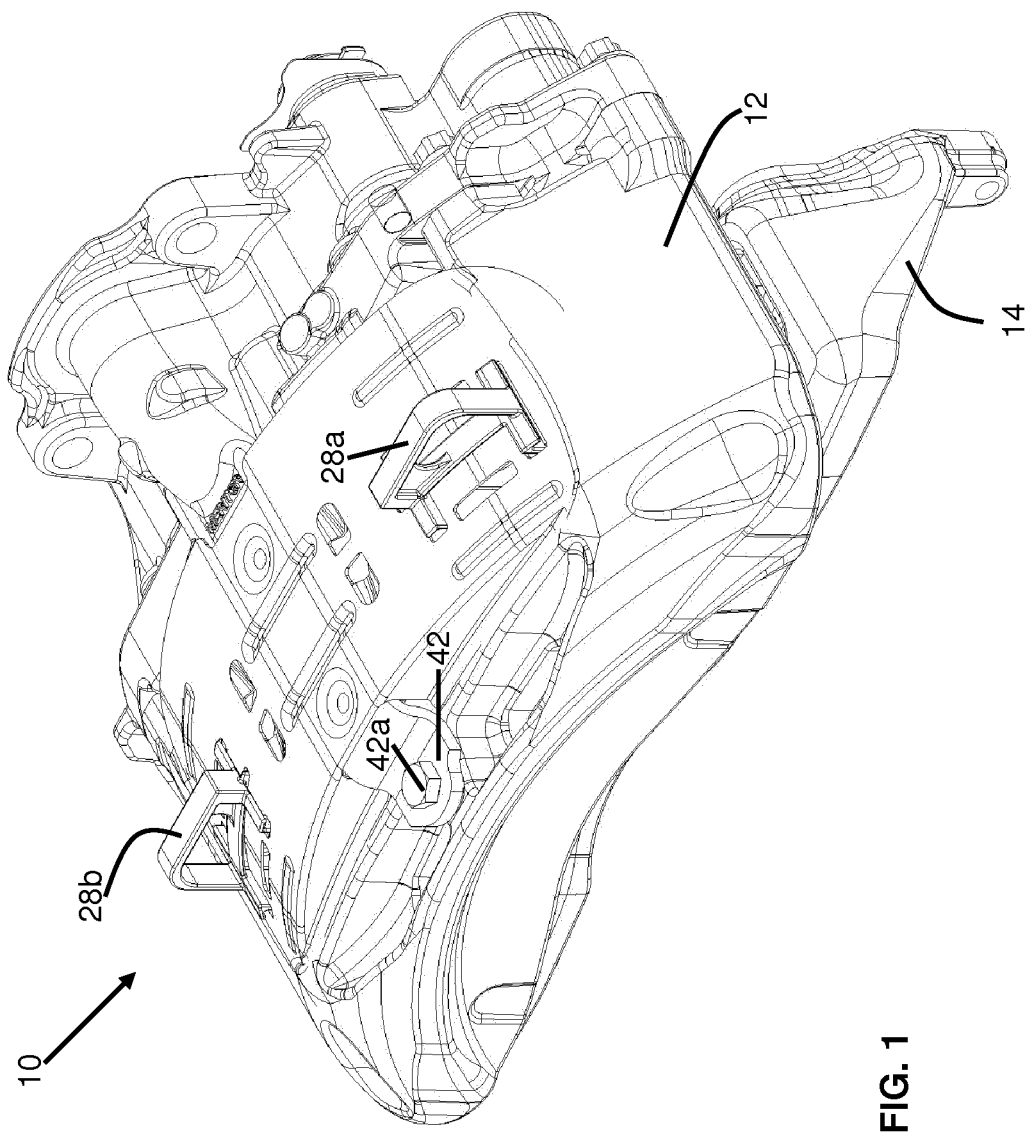

(51) Int. Cl.
*F16D 65/00* (2006.01)
*B60T 1/06* (2006.01)

(52) U.S. Cl.
CPC .. *F16D 2055/0037* (2013.01); *F16D 2250/00* (2013.01); *F16D 2250/0084* (2013.01)

(58) Field of Classification Search
CPC ......... F16D 2250/0084; F16D 65/0081; F16D 2055/0033
USPC .......................................... 29/428; 188/73.32
See application file for complete search history.

(56) References Cited

U.S. PATENT DOCUMENTS

| | | | |
|---|---|---|---|
| 8,662,261 B2* | 3/2014 | Raffin | F16D 65/0978 188/1.11 W |
| 8,857,575 B2* | 10/2014 | Philpott | F16D 65/0977 188/218 A |
| 9,046,143 B2* | 6/2015 | Barland | F16D 65/0031 |
| 9,068,610 B2* | 6/2015 | Philpott | F16D 65/0043 |
| 2008/0110707 A1* | 5/2008 | Kromer | F16D 65/00 188/218 A |

* cited by examiner

DISC BRAKE ASSEMBLY

CROSS-REFERENCE TO RELATED APPLICATIONS

This application is the U.S. national phase of PCT Application No. PCT/EP2014/065836 filed on Jul. 23, 2014, which claims priority to European Patent Application No. 13179532.0 filed on Aug. 7, 2013, the disclosures of which are incorporated in their entirety by reference herein.

The present invention relates to disc brake assemblies for vehicles such as lorries, trucks and the like.

Known disc brake assemblies include a caliper and a carrier. The carrier is typically fixed to a suspension component of the lorry or truck and the caliper is slideably mounted on the carrier. The carrier has an inboard part and an outboard part connected via circumferentially spaced bridge arms (side beams) thereby defining an opening through which brake pads can be inserted and removed during servicing of the brake. The caliper similarly has an inboard part and an outboard part again connected via circumferentially spaced bridge arms. The caliper creates a clamping force on the brake pads and as the brake pads engage the brake disc there is created a drag force which is reacted by the carrier.

Once the brake pads have been inserted into the caliper, a pad strap or pad retainer secures them in place.

During assembly of a vehicle, typically the brake disc (or rotor) will be assembled early in the process, and then at a later stage a disc brake subassembly including a caliper, a carrier and brake pads will be assembled onto the rotor. In order for the disc brake assembly to be positioned on the rotor, the brake pads must be spaced apart by at least the thickness of the rotor. It is known for the disc brake assembly to be manufactured as a sub assembly by a component supplier and then shipped to the vehicle/axle assembly line. During this shipping process the brake pads can move from their initially assembled position closer together. Under such circumstances when the disc brake assembly arrives at the vehicle manufacturers assembly line, it is necessary for an operator to move the pads apart so that the assembly can fit over the rotor. The task of moving the brake pads apart is time consuming and therefore costly.

It is known for disc brake assembly manufacturers to insert a spacer between the brake pads prior to shipping. This spacer ensures that a minimum distance is maintained between the brake pads and therefore when the brake assemblies arrive at the vehicle/axle assembly line the pads are still spaced apart by a minimum distance and therefore the disc brake subassembly can be assembled straight onto the rotor without the need to move the pads further apart. The spacer can either be discarded or returned to the disc brake assembly manufacturer's plant for use during shipping of further disc brake assemblies.

EP1570189 shows a sliding caliper disc brake assembly and associated rotor. In this case the opening defined by the inboard part, outboard part and circumferentially spaced bridges (side beams) of the caliper is substantially closed by a shield. The purpose of the shield is to prevent excessive debris ingress into the brake. The shield is releasably attached to the pad retainer. The shield prevents insertion and removal of known spacers. Therefore when the disc brake assembly manufacturer ships the disc brake assembly with spacers, upon arrival at the vehicle assembly plant the cover has to be removed in order to remove the spacer. This is time consuming and therefore costly. Alternatively, disc brake assembly manufacturers may ship the disc brake assembly with spacers but without the shield being fitted. Under these circumstances the shield will be loose and may well become lost or separated from the rest of the assembly. If it had been lost or separated, then time will be spent finding the cover. Accordingly there is a need for disc brake assemblies including covers to be provided with means for maintaining a minimum distance between the brake pads but which means do not interfere with or slow down subsequent assembly of the disc brake assembly onto the rotor.

Thus according to the present invention there is provided a disc brake assembly arranged to be mounted over a rotor, the disc brake assembly including first and second brake pads, a caliper having an opening for receiving the first and second brake pad, a cover for closing the opening and a spacer for maintaining a minimum distance between the first and second brake pads, wherein the cover includes an opening pattern arranged to allow the spacer to be inserted and removed therethrough.

Figure 2:
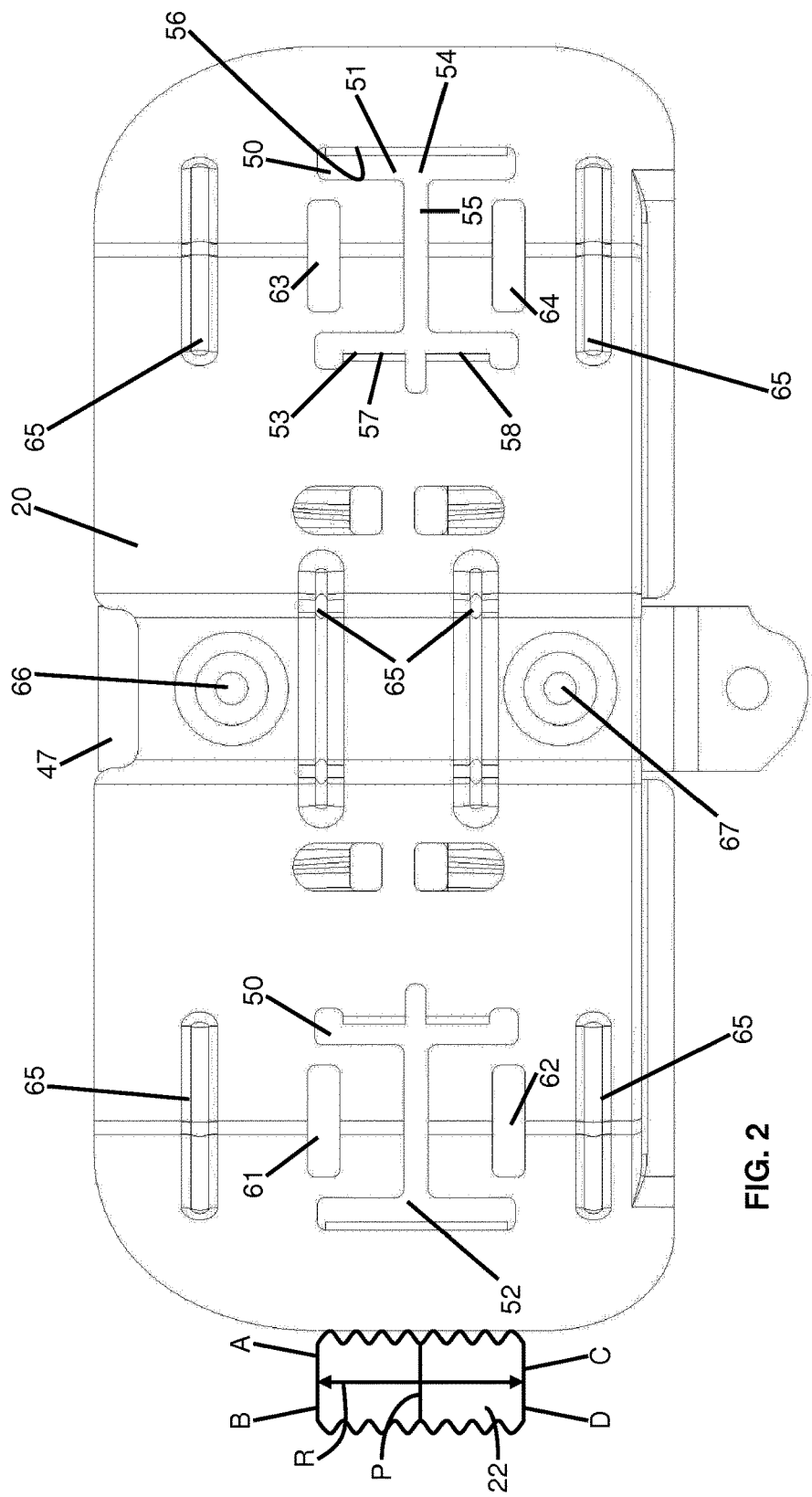
Figure 3:
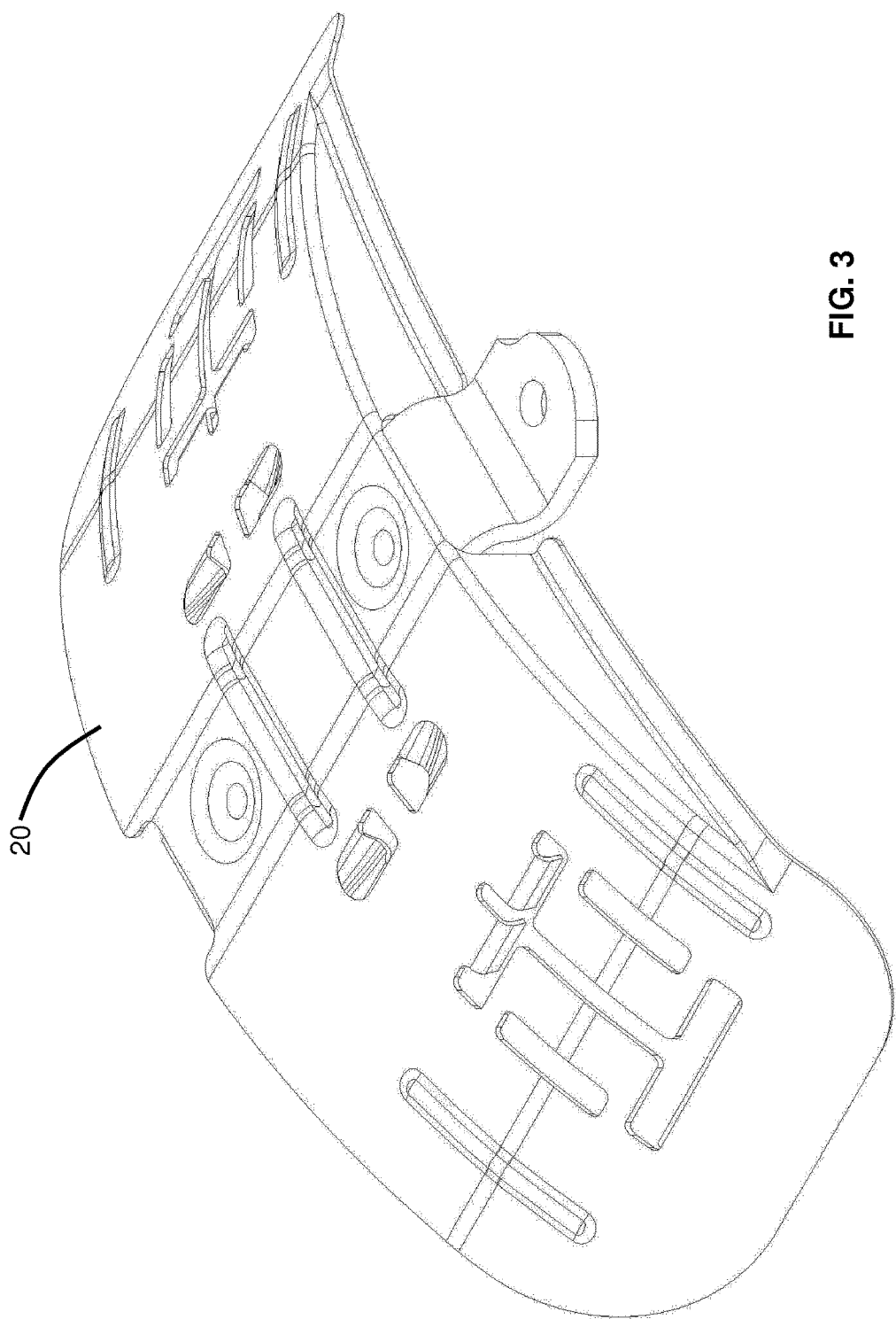
Figure 4:
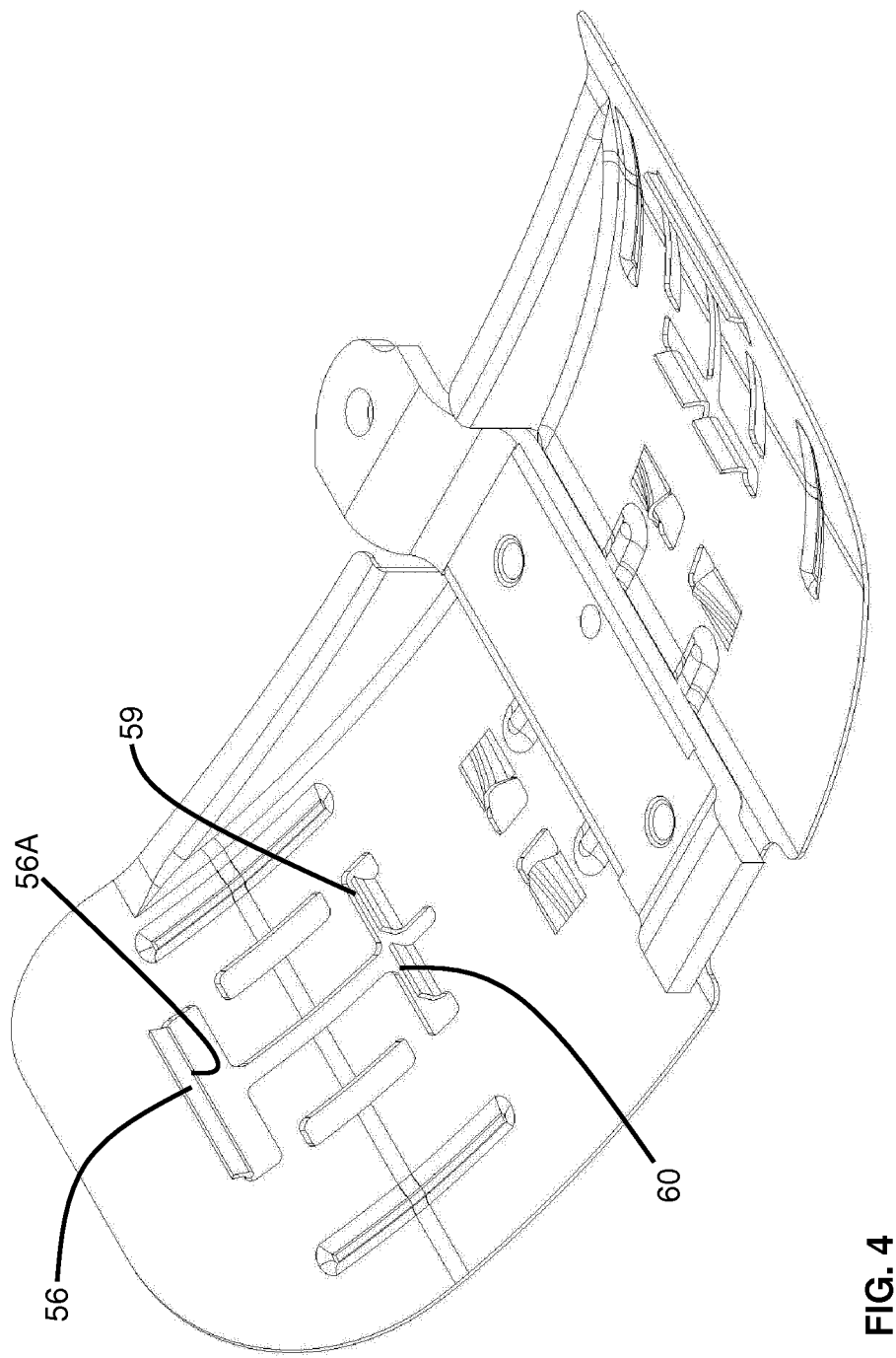
Figure 5:
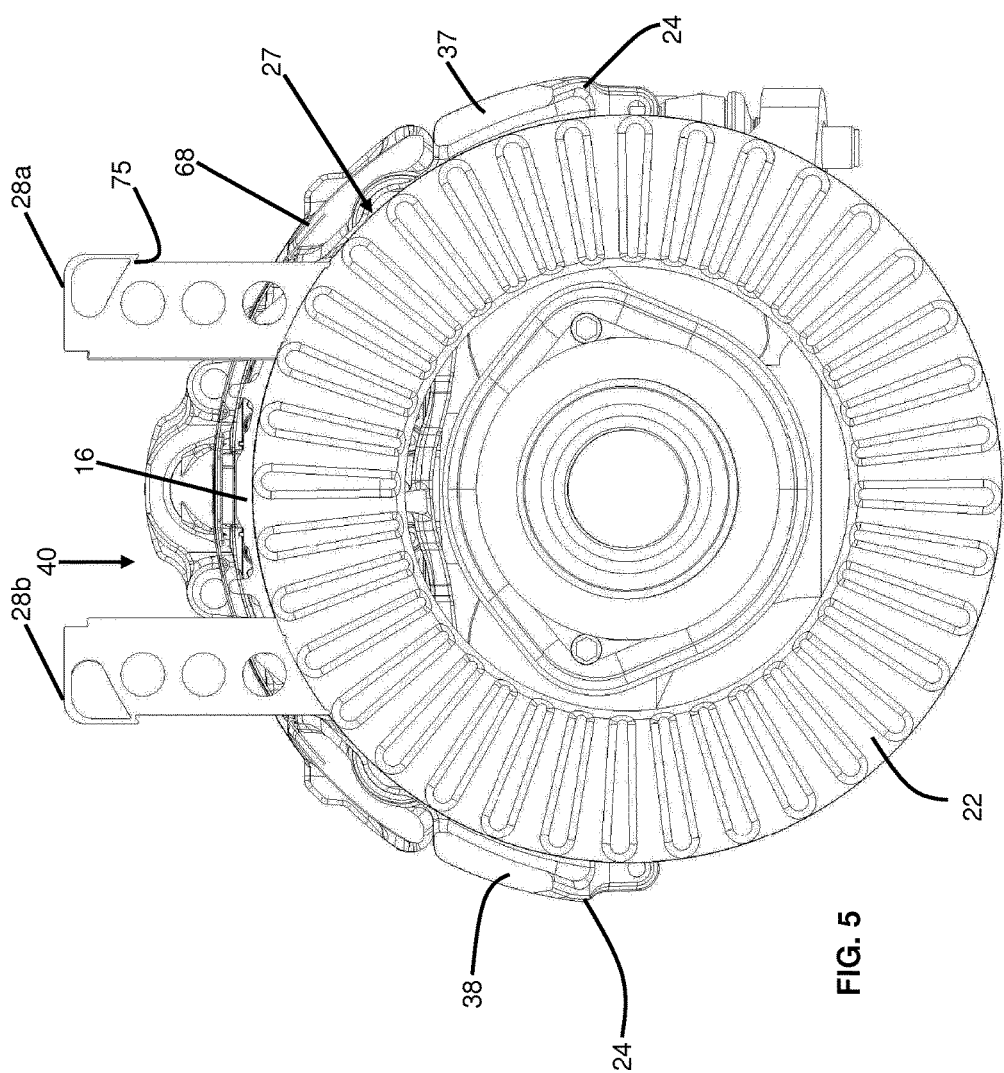
Figure 6:
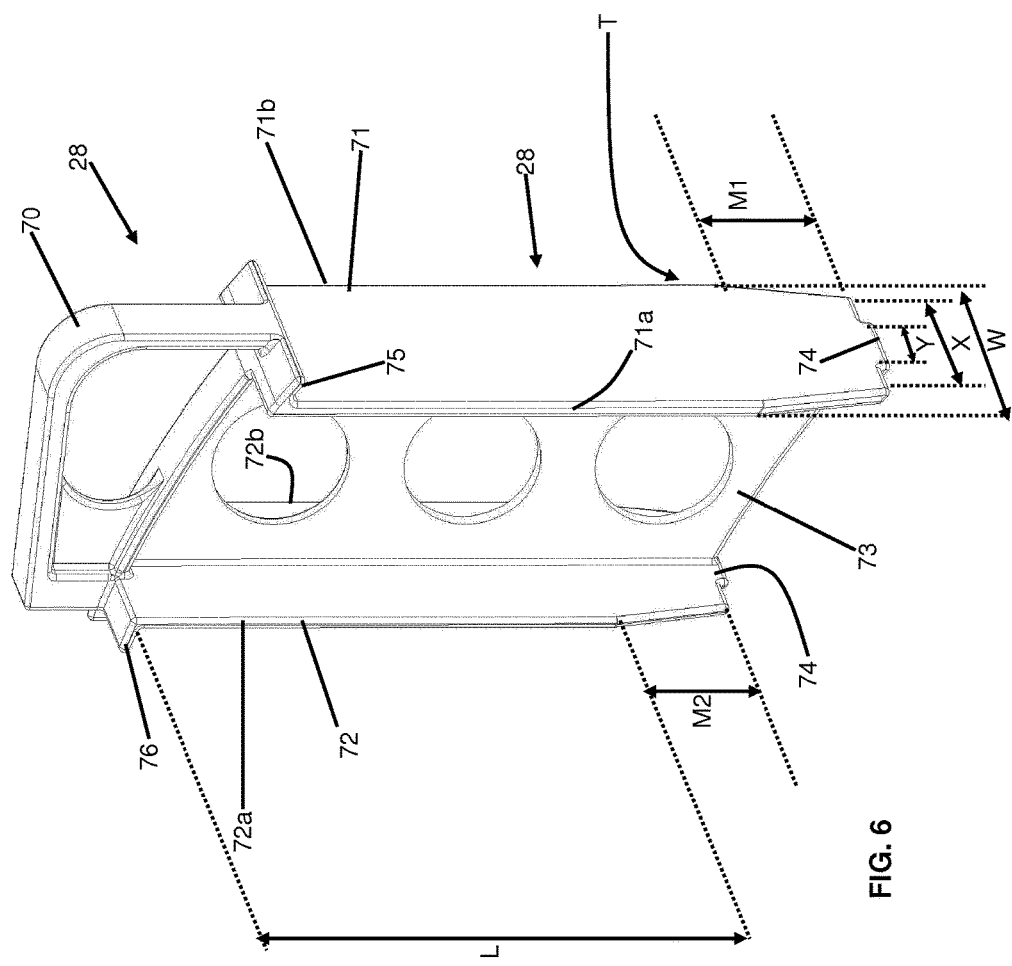
Figure 7:
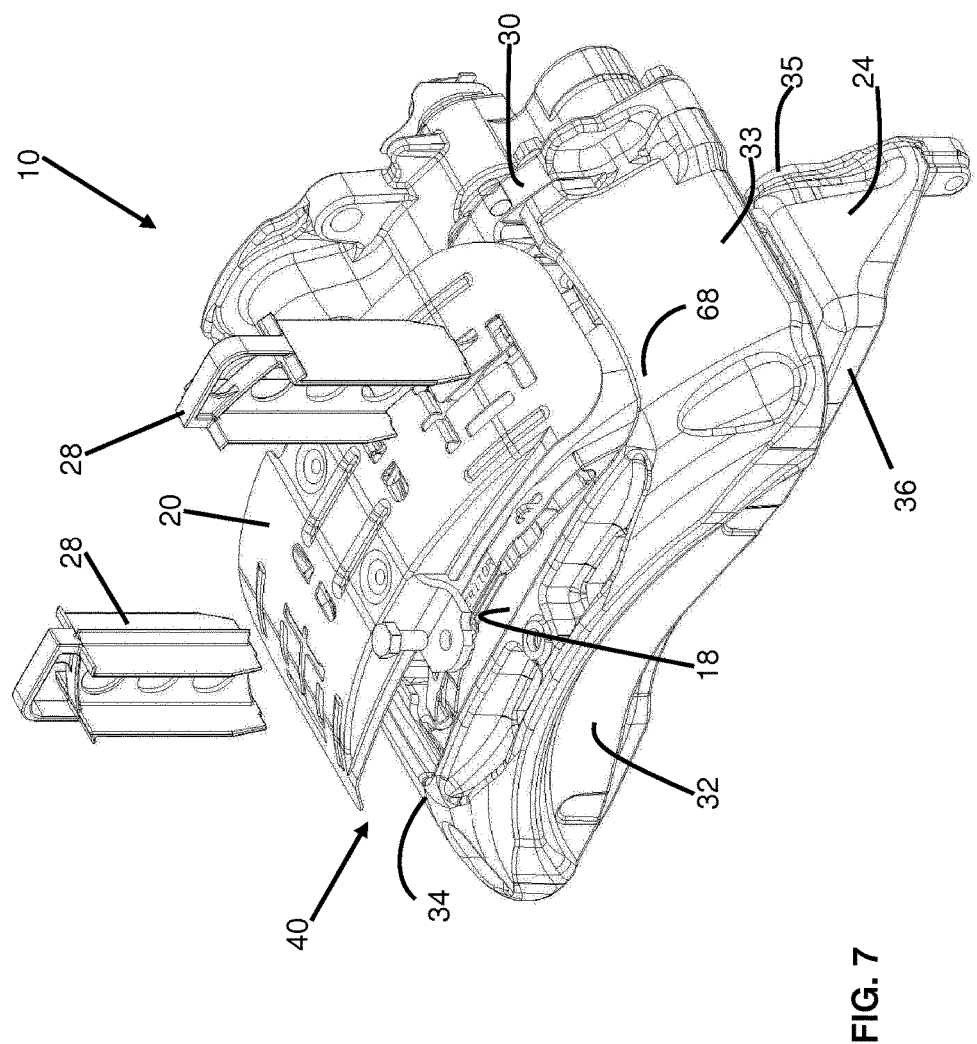

The invention will now be described, by way of example only, with reference to the accompanying drawings in which:

FIG. 1 is an isometric view of a disc brake assembly according to the present invention, FIGS. 2, 3 and 4 show the cover of FIG. 1, FIG. 5 shows a cross-section view of FIG. 1 including spacers (prior to insertion of the spacers), FIG. 6 shows a spacer for use with the disc brake assembly of FIG. 1, and FIG. 7 shows a part exploded view of FIG. 1.

With reference to FIGS. 1 and 7 there is shown a disc brake assembly 10 including a caliper 12, a carrier 14, first brake pad 16, second brake pad 18 and cover 20. The disc brake assembly 10 is shown in its working position relative to brake disc rotor 22. The caliper is slideably mounted on the carrier via pins (not shown). The carrier is attached to the vehicle/axle suspension component of the associated vehicle via lugs 24. The caliper has a first side (in this case an inboard side 30), a second side (in this case an outboard side 32). First and second sides are connected via circumferentially spaced caliper bridge arms 33 and 34. The carrier has a first side 35 (in this case an inboard side spaced from a second side (in this case an outboard side 36 by circumferentially spaced carrier bridge arms (side beams) 37, 38. The first caliper side 30, second caliper side 32 and caliper bridging arms 33 and 34 define an opening 40 through which the first and second brake pads can be inserted and removed. Once inserted, in order to retain the first and second brake pads in place a pad retainer 42 is attached to the caliper. Attached to the pad retainer is cover 20. The cover 20 limits the amount of mud, dirt, stones and the like that can enter the opening 40. This improves the service life of various components of the disc brake assembly and also improves the service life of the rotor.

In summary, the cover 20 has an opening pattern 50 through which spacers 28 can be inserted and removed. When the disc brake assembly manufacturer assembles the disc brake assembly the cover can be attached to the assembly and the spacers can be inserted through the opening pattern in order to ensure the brake pads remain spaced apart by a minimum distance during shipping of the assembly to the vehicle manufacturer. Once at the assembly line of the vehicle/axle manufacturer, the disc brake assembly can be positioned immediately adjacent to the rotor and the spacers can be removed either immediately prior to assembly of the brake assembly onto the rotor or whilst the disc brake assembly is being assembled onto the rotor. In this way during shipping the brake pads will not move towards each other and during assembly of the disc brake assembly onto the rotor it is not necessary to remove the cover to remove the spacers.

The spacers also prevent pads falling out of the caliper during transportation and therefore prevents them from becoming lost.

In more detail, the cover 20 is pressed from a sheet material, typically sheet steel. The opening pattern 50 consists of a first hole 51 and a second hole 52. First hole 51 is generally H shaped with a generally elongate portion 53 lying parallel and spaced from a generally elongate portion 54. Generally elongate portion 53 is connected to generally elongate portion 54 via a generally elongate portion 55 which is arranged perpendicular to the generally elongate portion 53 and 54 to form the H shape. The generally elongate portion 55 lies in a plane P defined by the rotor 22. The generally elongate portions 53 and 54 lie perpendicular to plane P. The edge 56A of the generally elongate portion 54 is formed by folding a flap 56 of material from which the cover is pressed. Edges 57 and 58 of the generally elongate portion 53 are similarly formed by folding flaps 59 and 60 of material from which the cover is formed. The folded down flaps in each H section serve to guide the spacers when they are being inserted into the assembly and also serve to guide the spacers out of the assembly when the brake assembly is being moved radially relative to the rotor (see below).

The second hole 52 is a mirror image of first hole 51.

The cover includes passages 61, 62, 63 and 64, each being elongate. Passages 61 and 63 are generally in line with a plane A defined by a face B of the rotor. Passages 62 and 64 are generally in line with a plane C defined by a face D of the rotor.

The cover 20 includes stiffening ribs 65 which are pressed ribs. The cover 20 is non-releasably attached to the pad retainer 42, in this case by welding, in particular spot welding at regions 66 and 67 of the cover 20.

As best seen in FIGS. 3 and 4 the cover is generally arcuate to match the generally arcuate surface 68 of the caliper against which the peripheral edge of the cover abuts when in use.

As best shown in FIG. 6, the spacer 28 is generally elongate having a generally H shaped cross section having flanges 71 and 72 connected via a web 73. Each flange has a maximum width W extending over length L. Towards the end of the spacer remote from handle 70 the width of the flange tapers inwardly to width X. This taper extends over length M1 on the flange 71 and M2 on flange 72. At the end of the spacer remote from handle 70 is a tab 74 of width Y, narrower than width X. Flange 72 is similar to flange 71 in this regard.

Between the handle and flange 71 is an abutment surface 75, best seen in FIG. 5. Between flange 72 and handle 70 there is an abutment 76, best seen in FIG. 6.

The spacer can be made from any suitable material for example a plastics material.

The assembly, shipping and mounting of a disc brake assembly on the associated rotor is as follows.

The caliper and carrier are assembled together and the first and second brake pads are positioned inside the caliper. The pad retainer is secured to the caliper in order to retain the brake pad in their correct radial position. Since the cover is attached to the pad retainer, the act of placing the pad retainer in place also causes the cover to be positioned in place. The two spacers 28 (labelled 28A and 28B in FIGS. 1 and 5) are then inserted through the respective first and second H shaped holes. The spacers are inserted such that the taper enters the H shaped hole first and once the tapered portion has passed through the H shaped hole it is then forced between the brake pads and, if one or other of the brake pads is slightly displaced closer to the opposing brake pad then the taper acts to force the brake pads apart to ensure they are spaced apart by a minimum distance, in this case distance W, i.e. the width of the flanges. The spacers are inserted until the abutments 75 and 76 engage that part of the cover adjacent to the associated generally elongate portions 53 and 54. Once the abutment 75 and 76 have engaged the cover, then it is no longer possible to insert the spacers any further. As such the abutment 75 and 76 prevent the spacer falling further into the caliper.

Once the disc brake assembly including caliper, brake pads, cover and spacers has been thus assembled as a sub assembly, it is shipped to the assembly line of the vehicle manufacturer. During shipping, the spacers maintain a minimum distance between the brake pads. This minimum distance W is slightly larger than the width R of the rotor.

Having arrived at the assembly line of the vehicle/axle manufacturer, to assembly the disc brake assembly onto the rotor, the disc brake assembly is moved to an intermediate position whereby the edges 71A and 72A of spacer 28A are aligned with face D of the rotor and edges 71B and 72B of spacer 28A are aligned with face B of the rotor (aided by the operator looking through passages 61, 62, 63 and 64). In this position the assembly is in its correct axial position relative to the rotor but not in its correct radial position relative to the rotor, in other words the assembly is spaced radially further out than its correct working position. From this interim position the disc brake assembly 10 is moved radially inward towards its correct working position. As the assembly moves inwardly the tabs 74 engage with a central circumferential recess 27 of the rotor 22. Continued lowering of the disc brake assembly 10 results in the spacers being ejected from the H shaped holes as the disc brake assembly 10 progressively moves towards its final working position. FIG. 5 shows the final working position of the disc brake assembly relative to the rotor and it can be seen that spacers 28A and 28B have largely been ejected from the H shaped holes. Once the disc brake assembly is in this position relative to the rotor the disc brake assembly can be secured to the appropriate vehicle/axle suspension component of the vehicle via lugs 24 of the carrier. The spacers 28A and 28B can then be removed.

As will be appreciated, the present invention allows for the caliper, first and second brake pads and cover to be assembled at the disc brake assembly manufacturer's assembly line and allows the spacers to then be inserted. The spacers ensure that by the time the disc brake assembly 10 has been shipped to the vehicle/axle manufacturer's assembly line the brake pads are still separated by a minimum distance and during final assembly of the disc brake assembly onto the rotor the spacers are easily removed. In particular it is not necessary for the vehicle manufacturer to remove the cover and pad retainer in order to remove the spacers, the spacers are removable with the pad retainer and cover in place.

As mentioned above, the caliper is slideably mounted relative to the carrier. Once the carrier has been fixed to the associated suspension/axle component, then the carrier is in its correct working position relative to the rotor. Once the caliper has been fitted over the rotor the brake pads ensure that the caliper is in its correct working position relative to the rotor. Once the caliper is in its correct working position relative to the rotor and the carrier is in its correct working position relative to the rotor, then the caliper is necessarily in its correct working position relative to the carrier. However, prior to assembly of the disc brake assembly 10 onto the rotor, it may be possible for the caliper to be in an incorrect working position relative to the carrier i.e. the caliper may slide on the pins to a non-working position relative to the carrier. The carrier includes surfaces (not shown) which, in use, are positioned close to the rotor faces B and D. The flanges of the spacer 28 are arranged such that they align the friction surface of the brake pads with the associated carrier surfaces because one part (an upper part) of the flanges 71 and 72 sit between the brake pads whilst another part (a lower part) sits between the carrier surfaces. In this way as the disc brake assembly 10 is assembled onto the rotor from the intermediate position, the caliper is in its correct axial working position and the carrier is also in its correct axial working position. As such it is not necessary for the operator to slide the caliper relative to the carrier as it is lowered over the rotor.

As described above, the caliper is slideably mounted on a carrier. In further embodiments, the caliper could be a fixed caliper. As described above, the carrier includes an inboard side and an outboard side and two circumferentially spaced carrier bridge arms (side beams). In further embodiments the carrier may simply comprise an inboard part without there being an outboard part and without there being circumferentially spaced carrier bridge arms (side beams).

As described above, the opening pattern is in the form of two generally H shaped holes. In further embodiments the opening pattern could be in the form of a single hole. In further embodiments the shape of the single or one or more holes could be any suitable shape. As described above the cover is pressed from a sheet material, in this case sheet steel. In further embodiments the cover could be pressed from materials other than steel, or the cover could be made other than by pressing techniques. As described above the cover is made separately from the pad strap and attached thereto. The attachment may be a releasable attachment, such as bolts or the like or the attachment could be a non-releasable attachment, such as a welding or the like. Alternatively any other form of releasable attachment could be used or any other form of non-releasable attachment could be used. In alternative embodiment the cover and pad strap could be integrally formed as a single unitary component, and any suitable process could be used for such a single unitary component. As described above the passages 61, 62, 63 and 64 are separate from the opening pattern. In further embodiments just one, or one or more passages could be used, the just one or one or more passages could be continuous with the opening pattern. As described above the lower end of the spacer includes a tab which engages an opening provided in the rotor. Further embodiments at the end of the spacer may have any suitable shape to engage any suitably shaped part of the rotor to eject the spacers during assembly. As described above, the spacers have abutments 75 and 76 to prevent the spacers passing through the opening pattern. In further embodiments any suitable abutments could be used to prevent the spacers passing all the way through the opening pattern. As described above spacer 28A is identical to spacer 28B and both spacers are used to ensure the brake pads are spaced apart during transit. In further embodiments the upper part of spacer 28A may be connected to the upper part of 28B to form a single spacer. As described above the spacers include a taper portion, though in further embodiments the taper portion is not required. As described above, the spacer is arranged to align the carrier in a correct working position relative to the caliper, though in further embodiments it is not necessary for the spacer to be arranged to align with a carrier in a correct working position relative to the caliper.

The invention claimed is:

1. A disc brake assembly arranged to be mounted over a rotor, the disc brake assembly comprising:
   first and second brake pads;
   a caliper having an opening for receiving the first and second brake pads;
   a cover for closing the opening; and
   a spacer for maintaining a minimum distance between the first and second brake pads, wherein the cover includes an opening pattern arranged to allow the spacer to be inserted and removed therethrough.

2. The disc brake assembly of claim 1 wherein the opening pattern includes a first hole that is substantially H shaped, wherein elongate sides of the first hole are aligned substantially transverse to the first and second brake pads.

3. The disc brake assembly of claim 2 wherein the opening pattern further includes a second hole that is substantially the same as the first hole.

4. The disc brake assembly of claim 1 wherein the cover is made from a sheet material and an edge of the opening pattern is folded to form a guide surface for the spacer.

5. The disc brake assembly of claim 2 wherein the cover further includes a passage through which the rotor can be viewed during installation of the disc brake assembly over the rotor, wherein the passage is separate from the opening pattern.

6. The disc brake assembly of claim 5 wherein the passage is situated between adjacent ends of the elongate sides of the first hole.

7. The disc brake assembly of claim 1 further including a pad strap to secure the first and second brake pads in the caliper, wherein the cover is permanently attached to the pad strap by welding.

8. The disc brake assembly of claim 1 wherein the spacer has an end arranged to engage with the rotor upon installation of the disc brake assembly over the rotor and the end of the spacer comprises a tab arranged to engage with an opening provided in the rotor.

9. The disc brake assembly of claim 1 wherein the spacer has a substantially H shaped cross section and/or wherein the spacer includes an abutment surface arranged to abut the cover to prevent the spacer from passing through the cover and/or wherein the spacer includes a tapered portion for separating the first and second brake pads, and/or wherein the disc brake assembly further includes a carrier, the caliper being slidably mounted on the carrier, wherein the spacer is arranged to align the carrier in a correct working position relative to the caliper.

10. A method of mounting a disc brake assembly about a rotor comprising the steps of:
   a) providing a disc brake assembly including first and second brake pads, a caliper having an opening for receiving the first and second brake pads, and a cover for closing the opening, the cover including an opening pattern;
   b) providing a spacer;
   c) inserting the spacer through the opening pattern and between the first and second brake pads to provide a minimum distance between the first and second brake pads;
   d) providing the rotor;
   e) moving the disc brake assembly and the spacer to an interim position such that a gap between the first and second brake pads is in a plane defined by the rotor; and f) moving the disc brake assembly radially relative to the rotor to a working position and removing the spacer.

11. The method of claim 10 wherein step b) includes providing the spacer with a tapered end and step c) includes inserting the tapered end of the spacer through the opening pattern such that the tapered end moves the first and second brake pads apart to the minimum distance.

12. The method of claim 10 wherein step a) includes providing a passage in the cover, and during step e) the rotor is viewed through the passage so as to align the gap with the plane defined by the rotor.

13. The method of claim 10 wherein the spacer is removed by being ejected as a result of engagement between the spacer and the rotor as the disc brake assembly is moved radially relative to the rotor to the working position.

14. The method of claim 13 wherein step b) includes providing a tab at an end of the spacer, step d) includes providing the rotor with an opening at a circumferential edge of the rotor and step f) includes engaging the tab with the opening as the disc brake assembly is moved radially relative to the rotor to the working position.

15. The method of claim 10 wherein step a) includes providing a carrier with the disc brake assembly, the caliper being slideably mounted on the carrier, and step c) further aligns the carrier in the working position relative to the caliper.

* * * * *